US012702136B2

(12) United States Patent
Goradia

(10) Patent No.: US 12,702,136 B2
(45) Date of Patent: Aug. 11, 2026

(54) SURFACE DISINFECTANT FORMULATION

(71) Applicant: Prerna Goradia, Mumbai (IN)

(72) Inventor: Prerna Goradia, Mumbai (IN)

( * ) Notice: Subject to any disclaimer, the term of this patent is extended or adjusted under 35 U.S.C. 154(b) by 0 days.

(21) Appl. No.: 17/750,367

(22) Filed: May 22, 2022

(65) Prior Publication Data

US 2023/0044014 A1 Feb. 9, 2023

(30) Foreign Application Priority Data

Aug. 5, 2021 (IN) ............................ 202121035319

(51) Int. Cl.
*A01N 59/20* (2006.01)
*A01N 25/04* (2006.01)

(52) U.S. Cl.
CPC ............ *A01N 59/20* (2013.01); *A01N 25/04* (2013.01)

(58) Field of Classification Search
CPC ................................ A01N 59/20; A01N 25/04
See application file for complete search history.

(56) References Cited

U.S. PATENT DOCUMENTS 10,034,478 B2 * 7/2018 Krasnow .................. A61K 8/25
2007/0275101 A1 * 11/2007 Lu ........................ C09D 5/1625
514/642

FOREIGN PATENT DOCUMENTS

CN 1547908 A * 11/2004
EP 3543325 A1 * 9/2019 ......... C11D 11/0017

* cited by examiner

*Primary Examiner* — Jianfeng Song
(74) *Attorney, Agent, or Firm* — Alley IP

(57) ABSTRACT

An aqueous disinfectant solution having a stable ionic form of metals like silver, copper, and zinc in combination having significant ability to kill or disabling microorganisms and acts as antifungal as well with an extended useful shelf-life characterized by its non-corrosive nature and possesses better residual efficacy.

7 Claims, 2 Drawing Sheets
(1 of 2 Drawing Sheet(s) Filed in Color)

FIG. 2

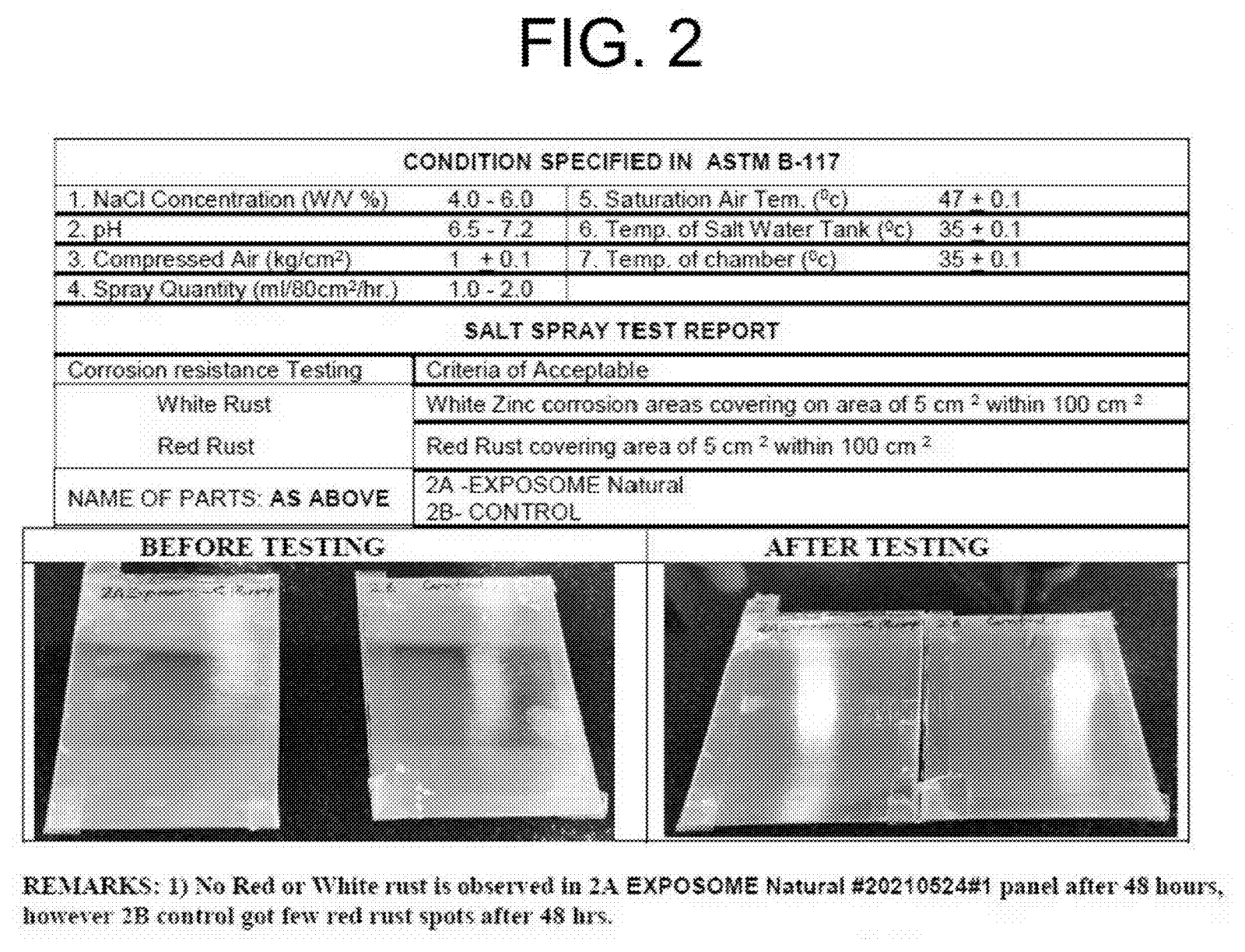

| CONDITION SPECIFIED IN ASTM B-117 | | | |
|---|---|---|---|
| 1. NaCl Concentration (W/V %) | 4.0 - 6.0 | 5. Saturation Air Tem. (°c) | 47 ± 0.1 |
| 2. pH | 6.5 - 7.2 | 6. Temp. of Salt Water Tank (°c) | 35 ± 0.1 |
| 3. Compressed Air (kg/cm²) | 1 ± 0.1 | 7. Temp. of chamber (°c) | 35 ± 0.1 |
| 4. Spray Quantity (ml/80cm²/hr.) | 1.0 - 2.0 | | |

| SALT SPRAY TEST REPORT | |
|---|---|
| Corrosion resistance Testing | Criteria of Acceptable |
| White Rust | White Zinc corrosion areas covering on area of 5 cm $^2$ within 100 cm $^2$ |
| Red Rust | Red Rust covering area of 5 cm $^2$ within 100 cm $^2$ |
| NAME OF PARTS: **AS ABOVE** | 2A -EXPOSOME Natural<br>2B- CONTROL |

| BEFORE TESTING | AFTER TESTING |
|---|---|

REMARKS: 1) No Red or White rust is observed in 2A EXPOSOME Natural #20210524#1 panel after 48 hours, however 2B control got few red rust spots after 48 hrs.

SURFACE DISINFECTANT FORMULATION

RELATED APPLICATIONS

This application claims priority under 35 U.S.C. § 119 to IN application No. 202121035319, filed Aug. 5, 2021. This IN Application and PCT Application PCT/IN2022/050066 filed Jan. 28, 2022 are incorporated by reference herein in their entireties.

BACKGROUND

It has been known, in the prior art, that the presence of copper and silver ions, in an aqueous solution, is useful as a disinfectant. It is well known that certain preparations of silver have germicidal properties. Silver was employed as a germicide and an antibiotic before modern antibiotics were developed.

Prior art citation, U.S. Pat. No. 7,803,407, discloses an aqueous disinfectant, comprising an aqueous solution of silver ion organic acid complex wherein the silver is electrolytically generated in a solution of the organic acid and water. More particularly, the aqueous disinfectant is formulated by electrolytically generating silver ions in water in combination with citric acid.

Prior art citation, U.S. Pat. No. 8,535,728, discloses a hydrogel composition comprising a hydrophilic acrylic acid copolymers dissolved in a composition of silver in water having a total concentration of silver between about 5 and 40 parts per million, wherein said silver is in the form of a stable and colorless colloidal suspension of silver particles having an interior of metallic silver and an exterior surface of ionic silver oxide, wherein at least 75% of the silver particles have diameters between 0.005 micrometers and 0.015 micrometers, wherein said silver particles are made from a silver electrode in an electrochemical cell, and wherein the composition manifests anti-microbial properties.

Prior art citation, U.S. Pat. No. 4,666,616, discloses anti-microbial compositions containing a mixture of a metal complex of a poly functional organic liquid and a biocidal composition which are particularly useful as metal working fluids at alkaline pH and have a broad spectrum of activity against fungi and bacterial.

Prior art citation, U.S. Pat. No. 3,702,298, discloses that silver, copper, and nickel are suitable metals and their salts have germicidal properties which are greatly increased and the spectrum broadened by converting the mono salt to a divalent or trivalent salt.

Prior art citation, U.S. Pat. No. 4,055,655A, discloses that antimicrobial activity is the relation of bacterial growth to the acidity or alkalinity of the media conducive to such growth, Concentrations of hydrogen ions compatible with growth are very low generally in the order of about pH 4 to pH 9. Almost all bacteria grow at about pH 7.0 but optimum pH values vary from species to species.

Prior art citation, U.S. Pat. No. 4,055,655 (hereinafter referred as '655), also discloses antimicrobial metal complexes which are very stable at high alkaline pH's on the order of about 9 to about 12 and, therefore, such complexes are very advantageously employed in alkaline media. '655 discloses disodium monocopper (II) citrate (MCC) as an antimicrobial compound. '655 also discloses a concentrate with an unlimited shelf-life, which can be mixed with hydrogen peroxide at a ratio of 1:99 to 1:199 to become an effective disinfectant obtained when a viscous solution of inorganic acid, with a pH less than or equal to 1.6, is mixed with a silver salt compound or a colloidal silver compound at 50° to 66° C. The mixture is further combined at room temperature with other inorganic acid(s) to reach a total of 100 g inorganic acid(s) per liter of water at room temperature, an organic acid stabilizer is added and the mixture is homogenized. The concentrate, during storage, remains homogeneous and crystal-clear.

Products disclosed in the prior art have used copper and silver ions, in an aqueous solution, as a disinfectant in water systems such as cooling towers, swimming pools, hot water systems in hospitals, potable water systems, spa pools, and the like.

In one of the prior arts, a disinfectant is in the form of a hydrogel comprising the use of hydrophilic acrylic acid copolymers.

In one of the prior arts, water was passed continuously through an ion chamber having copper and silver electrodes. The water emanating from the ion chamber contained the copper and silver ions generated by copper and silver electrodes within the ion chamber. The water emanating from the ion chamber containing the copper and silver ions was used as a disinfectant in water systems such as cooling towers, swimming pools, hot water systems in hospitals, potable water systems, spa pools and the like. The copper and silver ions within the water systems acted as a disinfectant for controlling algae, viruses, bacteria, and the like. The metal ions, generated in the system, act as disinfectant within water system but do not result into a product which can be used as a disinfectant.

This background provides a useful baseline or starting point from which to better understand some example embodiments discussed below. Except for any clearly-identified third-party subject matter, likely separately submitted, this Background and any figures are by the Inventor(s), created for purposes of this application. Nothing in this application is necessarily known or represented as prior art.

SUMMARY

The inventor has made favorable changes by incorporating innovative modifications in the disinfectant comprising metal ions like zinc, copper, and silver and works effectively at neutral pH and a slight acidic pH. Disinfectant characterized by its nontoxic, noncorrosive, liquid form with neutral or slightly acidic pH so as to minimize the corrosion of surroundings such as SS and other metal surfaces being used in contact stability further characterized by better residual efficacy. Example embodiments provide a disinfectant which not only provides the antimicrobial properties but also demonstrates better residual efficacy.

An example embodiments may be a disinfectant comprising free silver or copper and/or zinc ions, having free metal ions which can kill bacteria, fungi, and viruses.

Another example embodiment may be non-toxic disinfectant formulations effective at neutral pH or slightly acidic pH, wherein slightly acidic pH is achieved with the addition of just a few drops of vinegar or by virtue of the composition itself.

Another example embodiment may be a cosmetic/food-safe and/or in body formulation, which on contact due to the known antimicrobial properties of silver/copper and zinc ions.

Another example embodiment may be a disinfectant with slow release of mineral ions possessing significant ability to kill or disabling microorganisms; ions prepared using these methods are very stable and they react specifically with the microbes—the effect is long lasting and the disinfectants are expected to show residual efficacy.

Another example embodiment may be a disinfectant and the method of making which is an effective disinfectant for eliminating standard indicator organisms such as *Staphylococcus aureus, Salmonella* cholerasuis, and *Pseudomonas aeruginosa.*

Another example embodiment may have an antifungal property to a formulation comprising the use of zinc along with silver and copper; thus, providing a synergistic effect to act both as an antimicrobial and antifungal.

Another example embodiment may be an aqueous electrolytic disinfectant comprising silver, copper, and zinc.

Another example embodiment may be an electrolytic disinfectant having synergistic effect.

Another example embodiment may be an aqueous electrolytic disinfectant comprising salts of strong acids and strong bases as an electrolyte there by providing pH around 7.

Another example embodiment an aqueous electrolytic disinfectant comprising salts of strong acids and strong bases as an electrolyte and making it slightly acidic by incorporation of lower fatty acid such as acetic acid (vinegar).

Another example embodiment may be an aqueous non-corrosive electrolytic disinfectant.

Another example embodiment may be an electrolytic disinfectant free from polymeric materials such as acrylic acid.

Another example embodiment may be an aqueous electrolytic disinfectant, wherein ions will be having the protective layer.

Another example embodiment may be an improved disinfectant and the method of making which comprises a stable ionic formulation having an extended shelf-life.

Another example embodiment may be an improved disinfectant and the method of making it comprising distilled water with three metal ions of interest functionally effective at neutral and slightly acidic pH.

Another example embodiment may be a colorless transparent composition comprising silver, zinc, copper particles and water, wherein said particles comprise an interior of elemental metal ions with an exterior layer of an oxide, Another example embodiment may be an improved aqueous disinfectant and the method of making which is a non-corrosive, non-toxic, environmentally friendly.

Another example embodiment may be an improved disinfectant and the method of making which may be packaged in a concentrated aqueous form.

Another example embodiment may be an improved disinfectant and the method of making having longer shelf life.

Another example embodiment may be an improved disinfectant and the method of making which may be electrolytically generated in a batch process or a continuous process.

Another example embodiment may be an improved disinfectant and the method of making which is electrolytically generated in an economical manner.

Example embodiments include an aqueous disinfectant solution having a stable ionic form of metals like silver, copper, and zinc in combination having significant ability to kill or disabling microorganisms and acts as antifungal as well with an extended useful shelf-life characterized by its non-corrosive nature and possesses better residual efficacy.

An example embodiment disinfectant composition comprises a zinc salt having 1-20% (w/v); a biopolymer having 1-10% (w/v); silver and copper active forms, at low concentrations, having 0.001-0.1% (w/v); wherein the pH of the disinfectant composition is greater than or equal to 5 and less than or equal to 8; and wherein the molar ratio zinc to silver and or copper is between 100 to 1 and 10,000 to 1.

In at least an embodiment, the salt of zinc is selected from zinc chloride, zinc sulphate, zinc sulfide, and zinc carbonate, preferably zinc chloride.

In at least an embodiment, wherein the silver and copper are formed electrochemically.

In at least an embodiment, wherein metal ion concentration of silver ions are lesser than 100 ppm, Copper ions are from <100 ppm, and Zinc ions ranges from 20000-200000 ppm.

In at least an embodiment, the amount of zinc or salt of zinc is 1.0 to 20 w/v %.

In at least an embodiment, the amount of silver or salt of silver is 0.001 to 0.1 w/v %.

In at least an embodiment, the amount of copper or salt of copper is 0.001 to 0.1 w/v %.

In at least an embodiment, the amount of hydrophilic polymer is 1.0 to 10 w/v %.

In at least an embodiment, the polymer is selected from a group comprising hydrophilic water soluble polymers such as Poly(ethylene glycol) (PEG), Polyvinyl pyrrolidone (PVP), Polyvinyl alcohol (PVA).

In at least an embodiment, the hydrophilic polymer is Polyvinyl pyrrolidone (PVP)

In at least an embodiment, the composition is in the form of a liquid.

In at least an embodiment, the composition is in a form selected from the group consisting of a powder form, a tablet form, a capsule form, an aerosol, an infusion, a spray, a mist, drop and powder for reconstitution.

Example methods include preparing a disinfectant composition, said process comprising the steps of: selecting a cooled reaction vessel; adding 80-90% of water in said vessel and deoxygenating it using nitrogen gas; incorporating 1.0-20% weight/volume of zinc chloride little by little to obtain a mixture; preparing silver and copper ionic stock solutions, separately, using an electrochemical cell and a filtration process; adding silver and copper solutions to the mixture; and adding hydrophilic polymer, bit by bit, with constant stirring to obtain a clear composition.

In at least an embodiment, wherein the amount of said water soluble hydrophilic polymer is in the range 1.0-10 w/v %.

BRIEF DESCRIPTIONS OF THE DRAWINGS

The patent or application file contains at least one drawing executed in color. Copies of this patent or patent application publication with color drawing(s) will be provided by the Office upon request and payment of the necessary fee.

Example embodiments will become more apparent by describing, in detail, the attached drawings, wherein similar elements are represented by similar reference numerals. The drawings serve purposes of illustration only and thus do not limit example embodiments herein. Elements in these drawings may be to scale with one another and exactly depict shapes, positions, operations, and/or wording of example embodiments, or some or all elements may be out of scale or embellished to show alternative proportions and details.

FIG. 2 shows corrosion data for Invented-Solution 8B.

DETAILED DESCRIPTION

Figure 1:
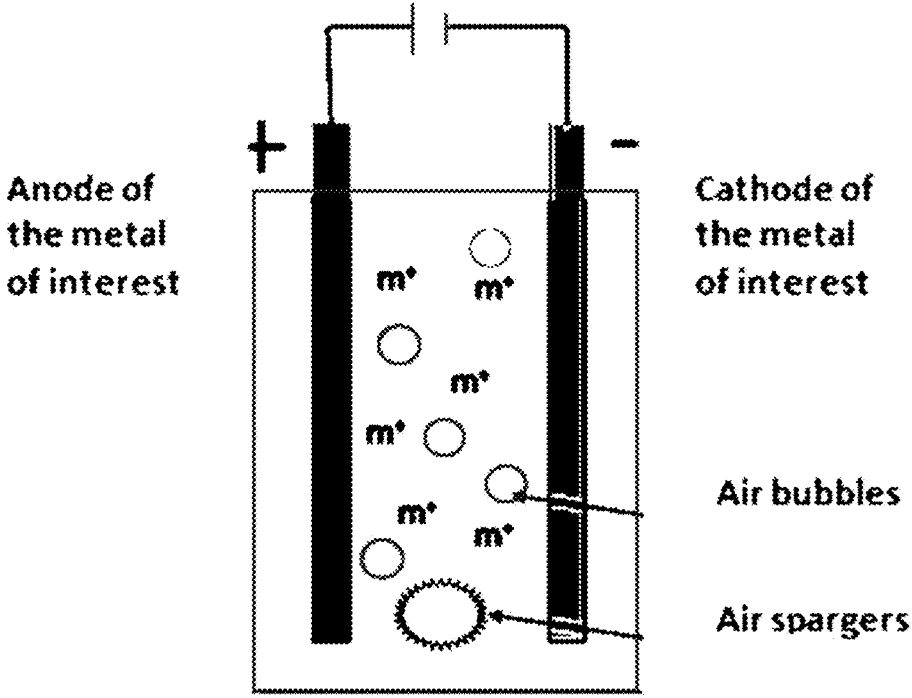
FIG. 1 is a basic electrical set up of an example embodiment.

Because this is a patent document, general broad rules of construction should be applied when reading it. Everything described and shown in this document is an example of subject matter falling within the scope of the claims, appended below. Any specific structural and functional details disclosed herein are merely for purposes of describing how to make and use examples. Several different embodiments and methods not specifically disclosed herein may fall within the claim scope; as such, the claims may be embodied in many alternate forms and should not be construed as limited to only examples set forth herein.

Membership terms like “comprises,” “includes,” “has,” or “with” reflect the presence of stated features, characteristics, steps, operations, elements, and/or components, but do not themselves preclude the presence or addition of one or more other features, characteristics, steps, operations, elements, components, and/or groups thereof. Rather, exclusive modifiers like “only” or “singular” may preclude presence or addition of other subject matter in modified terms. The use of permissive terms like “may” or “can” reflect optionality such that modified terms are not necessarily present, but absence of permissive terms does not reflect compulsion. In listing items in example embodiments, conjunctions, and inclusive terms like “and,” “with,” and “or” include all combinations of one or more of the listed items without exclusion. The use of “etc.” is defined as “et cetera” and indicates the inclusion of all other elements belonging to the same group of the preceding items, in any “and/or” combination(s). Modifiers “first,” “second,” “another,” etc. may be used herein to describe various items, but they do not confine modified items to any order. These terms are used only to distinguish one element from another; where there are “second” or higher ordinals, there merely must be that many number of elements, without necessarily any difference or other relationship among those elements.

When an element is related, such as by being “connected,” “coupled,” “on,” “attached,” “fixed,” etc., to another element, it can be directly connected to the other element, or intervening elements may be present. In contrast, when an element is referred to as being “directly connected,” “directly coupled,” etc. to another element, there are no intervening elements present. Other words used to describe the relationship between elements should be interpreted in a like fashion (e.g., “between” versus “directly between,” “adjacent” versus “directly adjacent,” etc.).

As used herein, singular forms like “a,” “an,” and “the” are intended to include both the singular and plural forms, unless the language explicitly indicates otherwise. Indefinite articles like “a” and “an” introduce or refer to any modified term, both previously-introduced and not, while definite articles like “the” refer to the same previously-introduced term. Relative terms such as “almost” or “more” and terms of degree such as “approximately” or “substantially” reflect 10% variance in modified values or, where understood by the skilled artisan in the technological context, the full range of imprecision that still achieves functionality of modified terms. Precision and non-variance are expressed by contrary terms like “exactly.”

The structures and operations discussed below may occur out of the order described and/or noted in the figures. For example, two operations and/or figures shown in succession may in fact be executed concurrently or may be executed in the reverse order, depending upon the functionality/acts involved. Similarly, individual operations within example methods described below may be executed repetitively, individually or sequentially, so as to provide looping or other series of operations aside from exact operations described below. It should be presumed that any embodiment or method having features and functionality described below, in any workable combination, falls within the scope of example embodiments.

The inventor has recognized that in some processes, the disinfectant with the acidic pH can cause corrosion while those with alkaline pH may cause irritation and dryness. In some processes, water passing through the chambers having the electrodes generates silver and copper ions electrolytically thereby disinfecting the water passing through it. However, the said prior art does not make the product that is used as disinfectant. The disinfectant with the acidic pH can cause the corrosion while those with alkaline pH may cause the irritation and dryness. Further one of the prior arts discloses that almost all bacteria grow at about pH 7.0. Another drawback associated with the use of polymeric acrylic acid involved in formation of hydrogel. The products disclosed in the prior art does not talk much about the residual efficacy. In view of above there is a dire need for aqueous based disinfectant with proven residual efficacy.

The present invention is disinfectant formulations and methods of making the same. In contrast to the present invention, the few example embodiments and example methods discussed below illustrate just a subset of the variety of different configurations that can be used as and/or in connection with the present invention.

Example embodiments relate to disinfectants particularly to an environmentally friendly, non-toxic, non-corrosive with longer shelf life and better residual efficacy as an aqueous disinfectant for specific use against pathogenic bacteria, viruses and fungi and the like. Example embodiments include aqueous disinfectant solutions having a stable ionic form of metals like silver, copper, and zinc in combination having significant ability to kill or disabling microorganisms and acts as antifungal as well with an extended useful shelf-life characterized by its non-corrosive nature and possesses better residual efficacy.

Here, the term used “residual efficacy” is in the context that in the recent time, there has been increased interest in obtaining residual efficacy (i.e., that product provides an ongoing antimicrobial effect beyond the initial time of application, ranging from days to weeks to months). Traditional liquid-based antimicrobials treat the surface at the time of application but do not provide efficacy beyond the time of application.

The extended useful shelf-life of the aqueous disinfectant solution enables the aqueous disinfectant solution to be packaged in an aqueous concentrate form. The extended useful shelf-life of the disinfectant enables the disinfectant to be packaged in an aqueous concentrated form.

The inventor represents the results from two different pH values viz. neutral and slightly acidic. The activity therefore, of an antimicrobial agent, in the pH range of microbial viability, is a very important consideration which, in fact, determines biocidal efficacy. The antimicrobial agents are very effective as microbicides for microorganisms including bacteria, fungi, and viruses.

Disclosed herein is a neutral pH, nontoxic, non-corrosive, neutral or slightly acidic disinfectant so as to minimize the corrosion of surroundings such as SS and other metal surfaces being used in contact with better residual efficacy. There is desire from stakeholders and the public for products those are continuously active and can provide efficacy in between regular cleaning and disinfection. These products may lower the level of re-contamination on high touch surfaces.

Disclosed herein is an innovative electrolytic disinfectant working effectively at neutral or at slightly acidic pH (ranging from 5 to 8) comprising silver, zinc, and copper ions which are generated electrolytically and gets dispersed/precipitated in water/aqueous solution in association with certain alkali metal salts to kill or to disable microorganisms which are hazardous to human beings.

Example embodiments include compositions comprising silver, zinc, copper ions which are generated, electrolytically, in aqueous solution, wherein said particles comprise an interior of elemental metal ions and outer layer is ionic or complexed species thereby imparting stability and longer shelf life and long-term efficacy. Owing to the pH of the disinfectant may be used as surface disinfectant and food contact sanitizer provides an unparalleled combination of high efficacy and low toxicity with instant kill and long-term efficacy. It is suitable for food contact surfaces and is gentle enough to be used in childcare environments. Example embodiments may use of small amounts of good electrolytes with certain metals.

The preferred embodiments, described herein, are for illustrative purposes only and are by no means limiting and can be further enhanced by many variations. It is understood that various omissions and substitutions of equivalents are contemplated as circumstances may suggest or render expedient but are intended to cover the application or implementation without departing from the spirit or scope of the disclosure.

Example embodiments include disinfectant formulations with slow release of mineral ions possessing significant ability to kill or disable microorganisms and fungi; thereby, imparting an excellent efficacy and residual efficacy.

In an embodiment, a silver zinc electrolytic disinfectant is prepared by an electrochemical process using zinc chloride electrolyte and silver anode, wherein an electrolytic disinfectant comprising free silver and zinc ions kills bacteria and viruses, this concept evolves in cosmetic formulations which processes antimicrobial properties due to presence of silver and zinc ions. This surface disinfectant and food contact sanitizer provides an unparalleled combination of high efficacy and low toxicity with instant killing and long-term efficacy. It is used for food contact surfaces and is gentle enough to be used in childcare environments.

In a specific embodiment, zinc and silver electrodes were connected to a direct current power supply. When the direct current was applied to the zinc and silver electrodes, zinc and silver ions are generated by an electrolysis process producing zinc and silver ions within the water/aqueous solution.

In a still more specific embodiment, the disinfectant composition wherein metal ion concentration of mineral ions comprises copper ions ranges from about 20 to about 200,000 ppm, in various permutation and combination, to obtain an effective long lasting disinfectant composition against microbes.

In another embodiment zinc is made to be sacrificial anode and therefore it provides the source of zinc ions.

In another specific embodiment one of the formulations described is of pure stabilized copper and zinc ions in water affording the cleanest disinfectants.

In another embodiment aqueous solution containing electrolyte is made of strong acid and strong base; thus, providing neutral pH, which is made acidic using acetic acid, this low acidity becomes sufficient to make the copper anode which acts as sacrificial anode and undergoes the corrosion thereby generating copper ions thereby generates a strong and powerful disinfectant.

A very basic electrical set up for example embodiments is presented in FIG. 1.

One of the versions of the formulation is to provide a protective layer over the ions dispersed therein there by imparting the longer shelf life.

Procedure:

The formulation is so potent that it works even at near neutral pHs because the benefits of staying at this pH far outweighs the downside.

The formulations are highly stable to light and heat as they are electrochemically synthesized and a metal oxide surrounds the inner metal core.

Example 1

The most striking results were simply obtained with 200 g ZnCl2 in 1 liter water. Appreciable results were obtained both with A. *Niger* (fungus) and with *S. aureus* (bacterium commonly responsible for all major bone and joint infections).

*Niger* (*Aspergillus niger*) is a fungus and one of the most common species of the genus *Aspergillus*. It causes a disease called "black mold" or commonly known as black fungus on certain fruits and vegetables such as grapes, apricots, onions, and peanuts, and is a common contaminant of food.

*S. aureus* (*Staphylococcus aureus*) *S. aureus* is a bacterium commonly responsible for all major bone and joint infections and also a leading cause of bloodstream infections throughout much of the industrialized world.

TABLE 1

| Sample # | Electrolyte | Zone of Inhibition with *S. aureus* | Zone of Inhibition with *A. Niger* |
|---|---|---|---|
| Sample 1 | 200 g ZnCl2 in 1 liter water | 44.82 | 42.25 |

The ZnCl2 forms a transparent liquid having slightly acidic pH and has provided promising disinfectant activities in itself. Table 1 gives the zone results with *S. aureus* and with *Aspergillus Niger* fungus.

Agar well diffusion method is widely used to evaluate the antimicrobial activity of plants or microbial extracts. The agar plate surface is inoculated by spreading a volume of the microbial inoculum over the entire agar surface. Then, a hole with a diameter of 6 to 8 mm is punched aseptically with a sterile cork borer or a tip, and a volume (20 μL) of the antimicrobial agent or extract solution at desired concentration is introduced into the well. Then, agar plates are incubated under suitable conditions depending upon the test microorganism. The antimicrobial agent diffuses in the agar medium and inhibits the growth of the microbial strain tested. The bigger the zone (measured in mm), the better the antimicrobial action.

Example 2

In this example silver ions were introduced electrochemically in aqueous solution of the zinc chloride solution. The results are found promising wherein silver is introduced electrolytically even at very low concentrations of Zn and Ag showed the good microbial loading. The electrolytic disinfectant is found to be effective against *Staphylococcus*

*aureus* indicating that disinfectant comprising silver ions dispersed in aqueous zinc chloride is antibacterial.

TABLE 2

| Batch, pg # | chemical | Anode/cathode and time | Zone (in mm) | Interpretation |
|---|---|---|---|---|
| Sample 1 | 20 g ZnCl2 in 1 liter water | None | 18.43 (*S. aureus*) | Shows bacterial activity |
| Sample 2 | 20 g ZnCl2 in 1 liter water | Ag/SS, 2 h | 22.74 | Addition of silver improves the bacterial activity |

Table 2 shows result with a lower quantity of ZnCl2 as well.

Example 3

In this example Ag and Zn anodes are used in a configuration wherein current was applied to Ag for around 40 min and Zn for 5 minutes (the cathode is SS) The resulting solution containing both these metal ions showed appreciable efficacy with *S. aureus*. The metal ion concentrations were measured with AAS and reported here. The pH of the solution was near neutral and the mixture of silver and zinc is highly effective.

TABLE 3

| Batch, pg # | Chemical | AAS (Atomic Absorption Spectrometry) | Zone (mm) | Interpretation |
|---|---|---|---|---|
| Sample 3a | 100 g citric acid in water + 10 g trisodium citrate, PH ~6 | Ag: 69 ppm | 24.19 (*S. aureus*) | Showed bacterial activity |
| Sample 3b Silver and zinc electrodes as alternating electrodes. | 100 g citric acid in water + 10 g trisodium citrate, pH ~6 | Ag-62 ppm & Zn 3231 ppm | 29.50 (*S. aureus*) | Showed antibacterial activity. Addition of zinc improved the activity |
| Sample 3 c Cu electrodes both anode and cathode as wanted to minimize loss of metal being removed on cathode. | 100 g citric acid in water + 10 g trisodium citrate, pH ~6 | Cu-124 ppm | 28.29 | Showed antibacterial activity |
| Sample 3d Silver anode | 100 g citric acid in water, pH ~4 | Ag 76.6 ppm (AAS) | 29.90 (*S. aureus*) | Showed antibacterial activity, pH is lower |

Example 4

In this example, 1 liter water containing 10 g sodium sulphate (being a salt of strong acid and strong base) provides neutral pH, however the said solution was made little acidic using 20 mL vinegar in resulting into pH 4.5. Due to some acidity in the solution wherein vinegar enables the copper to act as sacrificial anode and gets corroded very well thus forming a very powerful disinfectant as seen from the microbiology results. However, zinc does not dissolve into the solution in such a formulation. This approach was successful in getting copper into the solution and showed a very promising activity on the *S. aureus*

TABLE 4

| | Zone of Inhibition with *S. Aureus* | Amt of metal measured with standardized titration |
|---|---|---|
| Cu Anode and SS cathode (1 hr) Sample 4a | 19.90 mm | 687 ppm |
| Zn anode and SS cathode (1 hr) Sample 4b | None | None |
| Ag anode and SS cathode (1 hr) Sample 4c | 12.43 mm | 190 ppm |

Example 5

In this example efficacy of Zinc and Silver mixture for *Candida albicans* (fungus) was measured 1% sodium sulphate (neutral solutions) containing both the metal ions. The formulation Sample 2c shows a very good efficacy with the fungus and could be promising.

TABLE 5

| | Zone of Inhibition with *Candida Albicans* | Amt of metal with standardized titration |
|---|---|---|
| Sample 5a: Ag Anode and SS cathode (1 hr.) | 13.23 | Ag: 107.9 ppm |
| Sample 5b: above solution diluted 1:3 | NO ZONE | Expected to be around 35 ppm |
| Sample 5c: Ag Anode and SS cathode (20 min) Zn Anode and SS cathode (20 min) | 13.68 mm | Ag 43 ppm, and Zinc 1308 ppm |

The example 5 shows the synergistic action of the silver and zinc ions where on the inclusion of the zinc the effect on the *Candida* fungus is seen even with a smaller concentration of the silver ions.

Example 6

Here, only the silver ions in neutral 1% sodium sulphate were tested and a dilute solution of the above was also used. A very clear formulation with a clear efficacy against both the gram positive and gram-negative bacteria was seen. It is seen from the results below, for the gram positive and gram-negative strains of bacteria, a good solution seems to be the silver neutral electrolytic formulation with the 1% of the added sodium sulphate. This is a novel formulation that has not been proven before and is stable, colorless, and effective.

TABLE 6

| | Zone of Inhibition with *S. Aureus* (Gram + ve) | Zone of Inhibition with *Pseudomonas* (Gram − ve) | Amt of metal with standardized titration |
|---|---|---|---|
| Sample 6a: Ag Anode and SS cathode (1 hr.) | 16.63 | 24.1 | Ag: 108 ppm |
| Sample 6b: above solution diluted 1:3 | 17.67 | 18.21 | Expected to be around 37 ppm |

In addition to this as per the finding of the inventor:

ZnCl2 electrolyte plus small amounts (typically, 10 ppm to 30 ppm) of electrochemical copper and silver. Example 3 where the silver, zinc and copper are made in citric acid plus trisodium citrate shows that the formulation is good for bacteria and combinations better than just the metal ions themselves.

In addition to this, example embodiments provide residual efficacy and long-term efficacy, stability after exposure to light and heat and non-corrosive nature.

Example embodiment disinfectant shows appreciably residual efficacy and long-term efficacy (30 days test is done, added herein below).

Example embodiment disinfectant shows the appreciable stability after exposure to light and heat both.

Example embodiment disinfectant has demonstrated non-corrosive nature by ASTM test.

Light and Heat Stability Results:

The inventor has studied the effect of light when the disinfectant formulation is exposed to the light. As per the results as depicted herein below confirms that even after getting exposed to sunlight for a week, an example embodiment disinfectant formulation remains quite stable, however it needs to be specified on the label before sending to the market.

Titration of zinc: With standard EDTA solution using Eriochrome Black T indicator (purple to peacock green color end-point)

Titration of silver: With standard KSCN solution using ammonium ferric alum indicator (white to buff color end-point)

Titration of copper: With standard sodium thiosulphate solution using starch indicator (bluish grey to white color end-point)

The solutions under the study were kept in sunlight for a week and held in an oven for 14° C. at 54° C.

TABLE 7

| EXPOSURE TO SUNLIGHT FOR A WEEK | | |
|---|---|---|
| Metal | Titration results before (in ppm) | Titration results after |
| Zinc | 68016 | 67098 |
| Silver | 10 | 10 |
| Copper | 12 | 12 |

TABLE 8

| EFFECT OF HEATING FOR 14 DAYS AT 54° C. | | |
|---|---|---|
| Metal | Titration results before (in ppm) | Titration results after (in ppm) |
| Zinc | 68016 | 67401 |
| Silver | 10 | 10 |
| Copper | 12 | 12 |

As per the results as depicted herein below confirms that even after heating the present formulation even after heating disinfectant formulation is quite stable, however it needs to be specified on the label before sending to the market.

The solution was prepared as follows:

Invented-Solution 8A 100 g ZnCl2 in 1 liter water with 3% biopolymer

Invented-Solution 8B: 100 g ZnCl2+copper solution containing 10% by volume 124 ppm Cu ions and 10% by volume silver solution containing 108 ppm silver ions. The solution was made up to 1 liter after adding about 3% biopolymer. Compared to the results with 108 ppm Ag above (see example 6a above) where the *S. aureus* showed a zone of 16.6 mm and the Pseudo showed a zone of 24.1 mm the results are extremely promising.

In the same vein, for the Cu solution alone (see example 3c above) the zone was only 28.3 ppm with *S. aureus*. For the zinc solution similar results were observed with only 100 g/l of the salt—but spiking the solution with small amounts of the copper and salt gave better results for fungus (more than 10% improvement in efficacy). The three ions worked in concert to give the best recorded results (see below). Even on the further dilution of the above solution (1:10) the result obtained was good with zone for *S. aureus* of 24.50 mm.

TABLE 9

| Results found are as under | | | |
|---|---|---|---|
| Samples | *S. aureus* | *Pseudomonas* | *Candida* |
| Invented-Solution 8A | 44.14 | 53.00 | 51.42 |
| Invented-Solution 8B | 42.14 | 51.29 | 57.62 |

Antimicrobial Efficacy Testing of Disinfectants:

Objective: Antimicrobial Efficacy Testing of Disinfectants on SS substrate.

Name of Sample: Invented-Solution 8B (as above)

Reference—Water

Test Method: Method similar to the AOAC dilution method but not the same.

Test culture: *S. aureus* (ATCC 6538)

Concentration of sample: As given by the client

Test Conditions:

Neutralizer used: DENA Broth

Contact time: 24 h at 35° C.

Incubation Temp.: 37° C.

Media and Reagent: Soyabean Casein Digest Agar

TABLE 10

| Neutralizer Test | | | | |
|---|---|---|---|---|
| Test | Particulars | Control | Test Results | % Recovery of control |
| Test A Neutralizer Effectiveness | Invented-Solution-8B + DENA + Organisms | 90 | 85 | 94.44 |
| Test B Neutralizer toxicity | DENA + Organisms | | 79 | 87.77 |
| Test C Test Organisms Viability | Phosphate buffer + organisms | | 82 | 91.11 |

Analysis Performance:

Preparation of Test Carrier Inoculums:

Approx. 1-5×$10^6$ CFU/ml of cell culture was applied on to sterile SS substrate, placed individually into separate plates.

The above substrate was placed into incubator 37 deg, for 40 min for drying.

After drying, the SS substrate was exposed to disinfectant, reference Complex or Water, Neutralizer solution along with microbes separately.

All the substrates from above were placed into different sterile petri plate containing Neutralizing media (except for neutralizer exposed substrate).

The above plates were sonicated for 1 min to facilitate the release of the carrier load from the sample surface into neutralizing broth and were plated to count the microbial load.

Incubate the plates for 37 deg. 24 hrs.

After incubation take out the readings with the help of Colony counter and interpret the results.

Results:

TABLE 11

ANTIMICROBIAL ACTIVITY OF INVENTED-SOLUTION-8B
Number of Bacteria on Untreated SS Substrate: 9.1 x 106 cfu/ml

| Sample | Bacteria on Treated SS Substrate CFU/ml | % Reduction | Log value | Antibacterial activity (Log reduction) |
|---|---|---|---|---|
| Reference (water) | 3.5 × 106 | — | 6.54 | — |
| Invented-Solution-B | 8.2 × 102 | 99.97 | 2.91 | 3.63 |

FIG. 2 shows corrosion data for Invented-Solution 8B.

Inference:

From above observations, Test samples, of Invented-Solution-B, when compared with water as reference sample on SS substrate shows 99.97% reduction for antimicrobial activity against *S. aureus* bacteria; thereby, showing that the formulation is highly advantageous.

Similar result has been recorded by the lab for post 30 days efficacy also.

Name of Sample: Invented-Solution-8B (study after 30 days of spraying it on a panel)

Reference—Water

Test Method: Method similar to the AOAC dilution method but not the same.

Test culture: *S. aureus* (ATCC 6538)

Neutralizer used: DENA Broth

Contact time: 24 h at 35° C.

Incubation Temp.: 37° C.

Media and Reagent: Soyabean Casein Digest Agar

TABLE 12

Neutralizer test

| Test | Particulars | Control | Test Results | % Recovery of control |
|---|---|---|---|---|
| Test A Neutralizer Effectiveness | Invented-Solution-8B + DENA + Organisms | 90 | 84 | 93.33 |
| Test B Neutralizer toxicity | DENA + Organisms | | 77 | 85.55 |
| Test C Test Organisms Viability | Phosphate buffer + organisms | | 83 | 92.22 |

Analysis Performance:

Preparation of Test Carrier Inoculums:

Take a SS Substrate, which was previously 30 days coated with antimicrobial formulation.

Approximately 1-5×$10^6$ CFU/ml of cell culture is applied on to sterile SS substrate, placed individually into separate plates.

The above substrate was placed into incubator 37° C. for 40 min for drying.

After drying, the SS substrate was exposed to disinfectant, reference Ccomplexor, Wwater, neutralizer solution along with microbes separately.

All the substrates from above were placed into different sterile petri plate containing neutralizing media (except for neutralizer exposed substrate).

The above plates were sonicated for 1 min to facilitate the release of the carrier load from the sample surface into neutralizing broth and were plated to count the microbial load.

Incubate the plates for 37 deg. 24 hrs.

After incubation the readings were noted with the help of a colony counter and results interpreted.

Results:

TABLE 13

Antimicrobial activity of Invented-Solution-8B
when compared with the reference:
Number of bacteria on untreated
SS Substrate: 5.7 x 106 cfu/ml

| Sample | Bacteria on Treated SS Substrate CFU/ml | % Reduction | Log value | Antibacterial activity (Log reduction) |
|---|---|---|---|---|
| Water Sample | 1.6 × 106 | — | 6.20 | — |
| Invented-Solution-8B | 6.7 × 102 | 99.95 | 2.82 | 3.37 |

Inference:

From above observations, Test samples Invented-Solution-8B treated after 30 days when compare with WATER as reference sample on SS substrate shows 99.95% reduction for Antimicrobial activity against *S. aureus* bacteria.

Further, this formulation is non-corrosive as seen in study below:

Corrosion Study:

The inventor has also studied the corrosivity of the sample and the results of the same as furnished herein below: As per the finding of the corrosive study it has been observed that batch material Invented-Solution-8B did not showed the presence of red or white rust, on the contrary the control sample has shown a few spot of the red rust clearly confirms the non-corrosive nature of the disinfectant formulation.

Interim Data: The interim method includes an efficacy assessment of the coated coupons following exposure to certain chemical solutions/mechanical abrasion. The motivation is to check for supplemental residual efficacy when the disinfection events are well spaced out. The test method provides for the evaluation of durability and the baseline efficacy of these treated surfaces against *Staphylococcus aureus* and *Pseudomonas aeruginosa*; the method can be adapted for additional microbes and viruses. A minimum 3 log reduction of test microbes within 1-2 hours is the required level of performance. The USEPA interim method to support efficacy requirements for the registration of coatings applied to surfaces that are intended to provide residual antimicrobial activity for a period of weeks and are designed to be supplements to standard disinfection practices.

In brief, the test method comprised two parts:

1) chemical treatment and abrasion; and 2) product efficacy.

The method used 1"×1" brushed stainless-steel carriers (150 grit) coated with the antimicrobial chemical and one set of uncoated control carriers. The carriers were exposed to 10 cycles of chemical treatment/abrasion in order to support a 1-week duration label claim of residual activity. Testing could be scaled up to support longer claims up to 4 weeks. The chemical exposure and abrasion processes were intended to represent a degree of normal and relevant physical wear, as well as reproduce potential effects resulting from repeated exposure of antimicrobial coated surfaces to three different biocidal materials (chemical solutions) as well as the impact of dry abrasion. Under controlled environmental conditions, the carriers received a 20 μL mixture of the test organism and soil load. Following a 15 min contact time, the carriers were neutralized and the number of viable microorganisms was determined quantitatively. The log reduction (LR) in the viable test organisms on exposed carriers was calculated in relation to the viable test organisms on the unexposed control carriers. The impact of the chemical exposure and abrasion on product efficacy was also determined by comparing carriers with and without coating not exposed to chemical treatment and abrasion.

The chemical exposure/abrasion cycle for a single chemical (Treatments A, B, and C) was done using a wetted sponge with a weight of 454 g. The dry abrasion treatment (Treatment D) was done using a dry sponge without additional weight to perform sixteen single passes across the carriers. 10 abrasion cycles were performed (80 single passes across the surface of the carrier for treatments A, B, and C; 160 single passes across the surface of the carrier for Treatment D with appropriate dry times between abrasion cycles on lot 1 to support a 1-week residual claim. The number of abrasion cycles performed was made for residual claims of 4 weeks. The results were promising in that the mechanical abrasion in the wet and dry states showed a ~3 log reduction or higher. In the presence of cleaning chemicals also there was a good antimicrobial ability.

TABLE 14

Results with sample Invented solution 8A
Results of the same are as depicted herein after

| | | As like Interim Method Organism used : *Ps. aeruginosa* | | | | | | |
|---|---|---|---|---|---|---|---|---|
| 22 Jul. 2021 | APX-P21070030 Observations | Count observed after coating | Log Value | Without coated-WC | Count observed without coating | Log Value | Log reduction | % reduction |
| Invented solution 8A | Coated-C | 1 | 0 | Without coated | 760000 | 5.880813592 | 5.880813592 | 99.99986842 |
| Lysol | C-A | 1 | 0 | WC-A | 790000 | 5.897627091 | 5.897627091 | 99.99987342 |
| Sanidate 6% | C-B | 1 | 0 | WC-B | 26000 | 4.414973348 | 4.414973348 | 99.99615385 |
| NaOCl - 2000 ppm | C-C | 1 | 0 | WC-C | 160000 | 5.204119983 | 5.204119983 | 99.999375 |
| | C-Wet | 1 | 0 | WC-Wet | 560000 | 5.748188027 | 5.748188027 | 99.99982143 |
| | C-Dry Control | 1950 | 3.290034611 | WC-Dry | 1800000 | 6.255272505 | 2.965237894 | 99.89166667 |
| | Positive control | 8.1 × 10^6 | | | | | | |
| | Media control | NG | | | | | | |
| | Neutralizer control | NG | | | | | | |
| | Sterility control | NG | NG - No growth | | | | | |

As per the above observations it was concluded that the inventive test sample 8A showed 5 log reductions bactericidal activity when compared to the without coated carrier specimen in the wet and 3 log reductions bactericidal activity in the dry.

For the coated specimen treated with 3 chemical treatment:

Sodium hypochlorite solution compared with uncoated specimen showed 99.99% reduction. There were no colonies (growth) observed on the coated sample.

Sanidate 6% (B) compared with uncoated specimen also showed 99.99% reduction.

Lysol compared with uncoated specimen showed 99.99% reduction. There were no colonies (growth) observed on the coated sample again.

While this detailed description has disclosed certain specific embodiments for illustrative purposes, various modifications will be apparent to those skilled in the art which do not constitute departures from the spirit and scope of the following claims, and it is to be distinctly understood that the foregoing descriptive matter is to be interpreted merely as illustrative and not as a limitation.

Some example embodiments and methods thus being described, it will be appreciated by one skilled in the art that examples may be varied through routine experimentation and without further inventive activity. For example, although liquid solutions are generated in some example systems, it is understood that other delivery forms including powders and tablets are useable with examples. Variations are not to be regarded as departure from the spirit and scope of the example embodiments, and all such modifications as would be obvious to one skilled in the art are intended to be included within the scope of the following claims.

The invention claimed is:

1. A disinfectant composition comprising:

zinc ions 20,000 to 200,000 ppm of the composition;

a biopolymer 1-10% by weight of the composition;

silver ions less 10 to 100 ppm of the composition; and copper ions less 10 to 100 ppm of the composition, wherein the silver and copper ions are formed from electrolysis of silver and copper metals such that the composition lacks a corresponding ion from a dissolved copper or silver compound.

2. The composition of claim 1, wherein the pH of the composition is greater than 7 to approximately 8.

3. The composition of claim 1, wherein the biopolymer is hydrophilic.

4. The composition of claim 1, wherein the biopolymer is at least one of Polyethylene glycol (PEG), Polyvinyl pyrrolidone (PVP), and Polyvinyl alcohol (PVA).

5. The composition of claim 1, wherein the biopolymer is hydrophilic Polyvinyl pyrrolidone (PVP).

6. The composition of claim 1, wherein the composition is in the form of a liquid.

7. The composition of claim 1, wherein the composition is a powder, a tablet, a capsule, an aerosol, an infusion, a spray, a mist, or a drop.

* * * * *